(12) United States Patent
Radulovic et al.

(10) Patent No.: US 7,415,390 B2
(45) Date of Patent: Aug. 19, 2008

(54) SYSTEM AND METHOD FOR ANALYZING DATA STREAMS

(75) Inventors: Dragan Radulovic, Hamden, CT (US); Amin Arshad Abdulghani, Piscataway, NJ (US); Ronald George Hiller, Colts Neck, NJ (US)

(73) Assignee: NetScout Systems, Inc., Westford, MA (US)

( * ) Notice: Subject to any disclaimer, the term of this patent is extended or adjusted under 35 U.S.C. 154(b) by 0 days.

(21) Appl. No.: 11/556,443

(22) Filed: Nov. 3, 2006

(65) Prior Publication Data

US 2007/0203674 A1   Aug. 30, 2007

Related U.S. Application Data

(60) Continuation of application No. 11/299,772, filed on Dec. 13, 2005, now Pat. No. 7,133,808, which is a division of application No. 10/193,756, filed on Jul. 12, 2002, now Pat. No. 7,031,884.

(51) Int. Cl.
*G06F 19/00* (2006.01)

(52) U.S. Cl. ................................................ 702/189
(58) Field of Classification Search ......... 702/182–185, 702/189
See application file for complete search history.

(56) References Cited

U.S. PATENT DOCUMENTS

| 6,216,119 | B1 | 4/2001 | Jannarone |
| 6,289,330 | B1 | 9/2001 | Jannarone |
| 6,327,677 | B1 | 12/2001 | Garg et al. |
| 6,735,553 | B1 | 5/2004 | Frogner et al. |
| 2003/0046026 | A1 | 3/2003 | Levy et al. |
| 2007/0157315 | A1* | 7/2007 | Moran ...................... 726/23 |

* cited by examiner

*Primary Examiner*—Edward Raymond
(74) *Attorney, Agent, or Firm*—Finnegan, Henderson, Farabow, Garrett & Dunner LLP

(57) ABSTRACT

A system and method operates to analyze a data stream, for example, a stream of download times for accessing information through a computer network. The system and method are capable of identifying abnormalities in the data stream compared to previous data in the data stream. More particularly, the system and method is capable of dynamically analyzing a data stream to detect abrupt, severe abnormalities as well subtle changes that occur over time.

31 Claims, 8 Drawing Sheets

SYSTEM AND METHOD FOR ANALYZING DATA STREAMS

RELATED APPLICATIONS

This application is a continuation of U.S. application Ser. No. 11/299,772 filed Dec. 13, 2005 (U.S. Pat. No. 7,133,808), which is a Divisional of U.S. application Ser. No. 10/193,756 filed Jul. 12, 2002 (U.S. Pat. No. 7,031,884), the contents of which are incorporated herein in their entirety by reference.

FIELD OF THE INVENTION

The present invention relates to a system and method for monitoring and analyzing a stream of data, for example, a stream of download times for accessing information through a computer network. The system and method analyze the data stream for unusual behavior based on previous values of the data stream.

BACKGROUND OF THE INVENTION

In recent years, advances in computer and network technology have led to the growth of networks providing fast and inexpensive access to information resources throughout the world. Networked computers are used at work, at home, and at school to share information and other content. Businesses use computer networks to deliver software, content, and services as well as to advertise and offer goods and services for sale. Consumers and businesses may select and purchase a variety of goods and services on-line. For example, books, clothing, electronics, and automobiles can be purchased on-line through vendor web sites. Likewise, financial services (such as stock trading, banking, and portfolio management), travel services, and news and information services, among others, are available on-line. Equally important, but perhaps not as evident to consumers, are a variety of on-line network services that support on-line businesses, such as transaction processors, security services, and e-mail service providers. Regardless of the type of goods and services provided, all on-line business must be concerned with the performance of their network operations. E-businesses unable to provide consistent, high performance are not likely to survive.

Individual businesses or entities that provide network applications have different network performance concerns. For example, a company may hire a Web service provider to provide its on-line services. The company may wish to conduct periodic audits to ensure that the Web service provider is fulfilling its obligation to provide satisfactory service. Similarly, the Web service provider may wish to validate the level of service quality it is providing and identify any problems that may exist or that may arise. Network management tools may be used to collect data from various locations and at various times. For example, the tools may collect connect times, download times for individual pages, domain name server (DNS) look-up times, and error messages, among other things. In fact, thorough network management tools may monitor tens or hundreds of parameters for a given website.

The data streams generated by the network management tools may be analyzed to evaluate network performance and detect and diagnose problems. However, analysis becomes difficult in practice because of the volume of information collected, variations in network usage, changes in the network, changes in equipment connected to the network (e.g., an increase in the number of servers used to meet network demand and/or installation of more efficient or faster servers), and changes in web sites, to name just a few.

In addition, Internet traffic (data transfer) is a poorly understood process. The current consensus is that the statistical nature of the data traces is fundamentally different from classical settings (e.g., Poisson-type processes), but the true nature of these processes remains elusive. The literature is flooded with contradictory empirical and theoretical studies, further contributing to the confusion. Given this environment, simply setting thresholds for tens or hundreds of parameters is arbitrary, inaccurate, and difficult in practice given the volume of information collected. For example, an arbitrarily set threshold may result in the detection of too many errors or too few errors. While the description above is primarily directed to network application, it should be appreciated that data streams can be generated by a variety of detectors, sensors, or other sources and that analysis of those data streams may also be desired. There remains a need for a system for analyzing data streams to detect abnormalities that is accurate and efficient and that can be run automatically without significant human intervention.

SUMMARY OF THE INVENTION

The present invention provides an accurate and efficient system and method for empirically analyzing a data stream for abnormalities. The system and method need not be tied to a particular model of expected behavior of the data stream (e.g., a Gaussian or Poisson distribution), but can use earlier data in the data stream to analyze more recent data. The system and method may be used to analyze computer network performance, but is robust enough to be used with any data stream, such as a stream of security prices or detector outputs. The system and method of the present invention can analyze streams of ordinal data as well as streams of categorical data.

According to one exemplary embodiment, the system and method analyze the data stream by computing multi-scale representation of the incoming data and comparing the representations with corresponding multi-scale historical representations. In a further aspect of the present invention, the comparison can be used to generate a ranking of the data under analysis in view of the historical representations. According to one embodiment, the incoming ordinal data used to compute the multi-scale representations is filtered to generate at least two types of data streams. The filtering can be used to enhance and/or suppress aspects of the incoming data stream. According to one exemplary embodiment, the incoming data stream can be filtered to produce a smooth data stream and a spiky data stream. Each of the multiple types of data streams can be used to compute type-specific multi-scale representations of the incoming data.

According to another aspect of the invention, the system and method dynamically maintain the multi-scale representations of historical data by combining the historical representation with a representation of recent data according to a dynamic scaling factor. According to a further aspect of the present invention, the historical representations are prevented from corruption by severe abnormalities by trimming outliers in representations of recent data by replacing the tail distribution with a predetermined function, such as a polynomial function. According to one exemplary embodiment, the historical representations of historical data can be made up of quantile distributions. The resolutions of the quantile distributions can be varied to adjust system memory and computation requirements.

Further, with respect to streams of categorical data, the representation of incoming data and the historical representation of historical data can be compared to generate a "distance" value. That "distance" value can be compared to a distribution of "distance" values simulated based on the representation of historical data to generate a ranking. For example, the representation of historical data can be sampled a relatively large number of times and the sampled data can be compared to the historical representation to produce simulated "distances." The simulated "distances" can be compiled to produce the distribution of simulated "distance" values.

Additional features and advantages of the invention will be set forth in the description that follows, and in part will be apparent from the description, or may be learned by practice of the invention. The objectives and advantages of the invention will be realized and attained by the system and method particularly pointed out in the written description hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the Drawings.

DESCRIPTION OF THE PREFERRED EMBODIMENTS

Reference will now be made in detail to the preferred embodiments of the present invention, examples of which are illustrated in the accompanying drawings. The present invention will be described in the context of analyzing a data stream of network system performance data. It should be appreciated that the present invention may be used to analyze data streams in other contexts as well.

Figure 1:
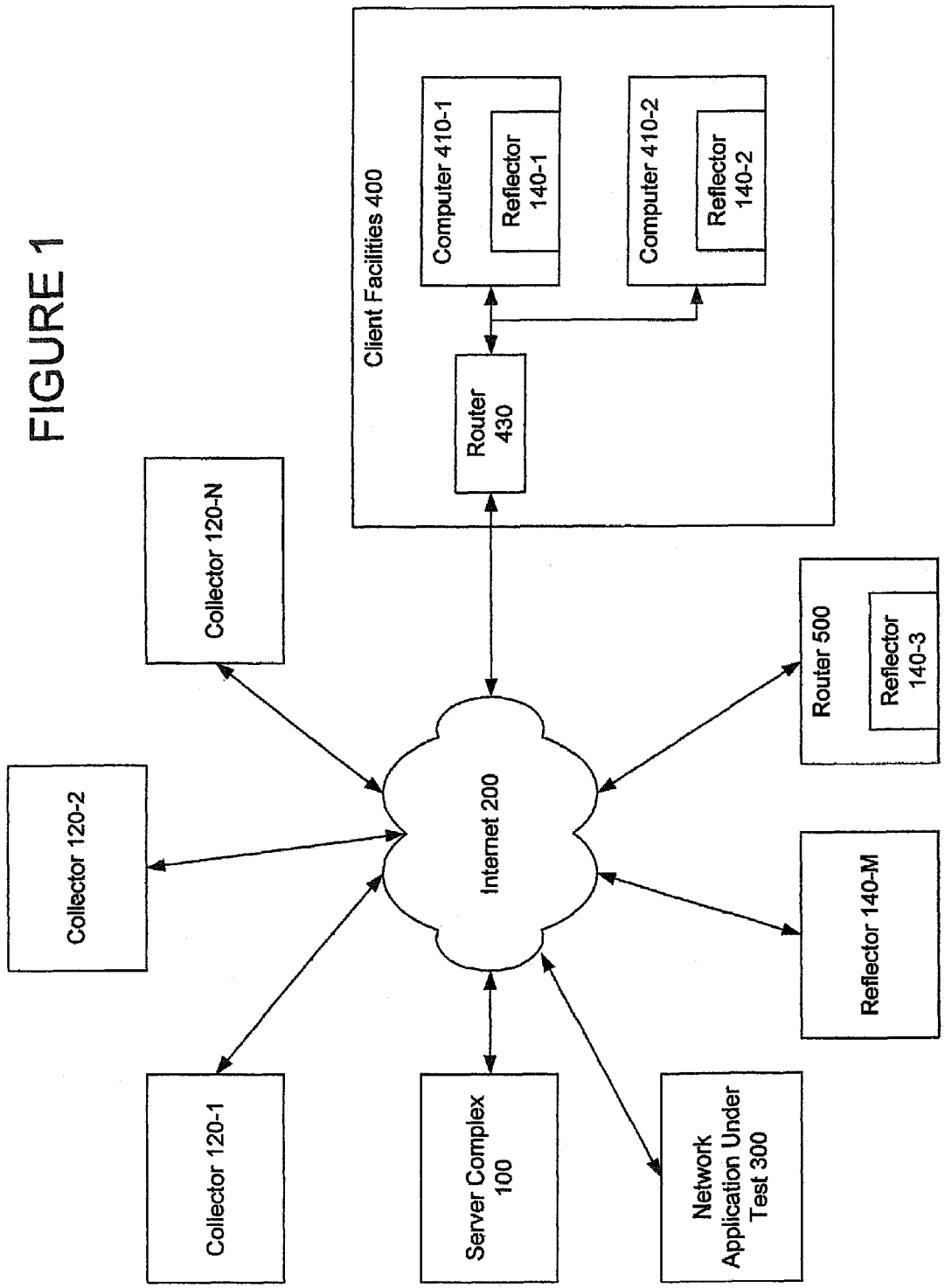
FIG. 1 illustrates an example of a network performance monitoring system in accordance with the present invention.

FIG. 1 provides an illustrative architecture of a network performance monitoring system in accordance with the present invention. Additional details may be found in U.S. application Ser. No. 09/851,378, filed May 9, 2001 and entitled "Network Performance Monitoring System", which is expressly incorporated herein in its entirety. As shown in FIG. 1, the network performance monitoring system includes a server complex 100, a plurality of collectors 120-1 to 120-N, and a plurality of reflectors 140-1 to 140-M connected by a network 200, that may include the Internet. Reflectors 140-1 to 140-M may be used to detect network data regarding the operation of the network application under test 300. Collectors 120-1 to 120-N may be used to collect data from the reflectors 140 (and possible detect addition data) and transmit the detected network data to the server complex 100 for analysis. Collectors 120 thus provide a data stream to server complex 100 comprising various detailed performance data, as will be discussed in greater detail below. While the embodiment shown in FIG. 1 uses collectors 120 and reflectors 140 to measure and collect network data, it should be appreciated that other network performance monitoring tools may be deployed instead of or in addition to the collectors/reflectors. For example, only collectors may be used.

Moreover, any network arrangement (for example, one or more networks or other connections) may be used so long as it is sufficient to enable the communications necessary or useful for the purposes described herein. The network performance monitoring system may monitor the performance of a network application 300 with respect to client facilities 400 and/or other locations. The network application 300 may be provided through one or more servers. For example, network application 300 may be a complex application that includes portions distributed over multiple servers. Network application 300 may also be the aggregate application service of multiple applications running on multiple servers, such as, for example, a service like an Internet search engine application, which may include multiple applications available through multiple servers. Each time a user connects to the search engine application over the Internet, the user may not necessarily connect to the same server. The network application 300 may provide information, deliver a service or content, through the network 200. The network application 300 may be offered by a business or other entity, such as a school, government entity, or other organization. Of course, the arrangement illustrated in FIG. 1 is merely an example. Collectors 120 and reflectors 140 (and or other network performance monitoring tools) may be deployed in other arrangements to monitor the network performance and services of network application for businesses or other entities. Moreover, collectors 120 and reflectors 140 may be used to monitor multiple network applications simultaneously.

Server complex 100 can process the data streams received from the collectors 120. For example, a collector 120 may transmit to the server complex 100 a data stream that includes several different types of data, e.g., error data, various download times (e.g., for several individual pages and for one or more combinations of pages), DNS look-up times, etc. The server complex 100 can split up the received data stream into multiple data streams based on the type of data contained in the received stream, e.g., an error data stream, download time data stream of various classes or types, etc. In addition, it should be appreciated that the successive items in the data streams received by the server complex 100 may not necessarily be evenly spaced in time. For example, a collector 120 may collect data over a predetermined period, the collected data representing regularly-spaced or quasi-regularly spaced intervals, or even irregularly spaced intervals. The collector 120 may then transmit the collected data in one or more bursts, so that the server complex receives the data stream in bursts.

Analysis is performed to detect abnormalities for the given stream of data. The implementation may be influenced by the nature of the input data (e.g., web page download times), but the core of the system and method is designed to work for any data stream. Processing is data driven with very few statistical assumptions. According to one preferred embodiment, the method is self-corrective and dynamically adapts to changes that occur in the data stream. In general, the processing performed in accordance with the present invention may involve multiple data streams, with each data stream processed in parallel consistent with the invention. The data streams may be ordinal or categorical. For example, ordinal data streams include numerical values, such as measured times, volumes, voltages, or other physical values. Alternatively, the data in the data stream may be categorical, for example, representing coded data. The coded data may correspond to various categories or types, such as different types of errors experienced or detected in a network. It should be appreciated that categorical data differs from ordinal data, even though categorical data may be represented using numbers for convenience (e.g., error type 5 corresponds to a "timed out" error, error type 4 corresponds to an "connection refused" error).

In accordance with the present invention, abnormalities in a data stream may be detected by examining the data stream itself. The data in the data stream is used to develop a model of the behavior of the data stream, rather than simply impressing a pre-conceived model on the data and detecting abnormalities based on that pre-conceived model. In addition, processing according to the present invention may be used to detect subtle changes over a large number of samples and sharp changes that occur in a few samples.

An exemplary embodiment of the present invention will be explained primarily using a data stream of "total times" necessary for the completion of a particular task, such as web page download, connect time, page component download, etc. However, as noted above, the present invention may be used with other data streams, such as security values (e.g., stocks, bonds, options, currencies, and/or derivatives), astronomical or physical measurement data, and various sensor or detector outputs, to provide just a few examples.

Figure 2:
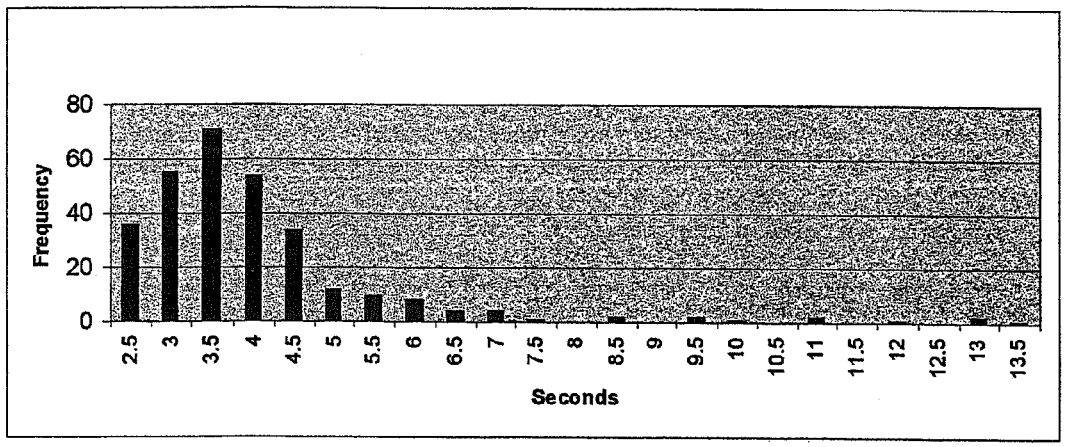
FIG. 2 illustrates a histogram of a sample data stream taken over a given period of time.
Figure 3:
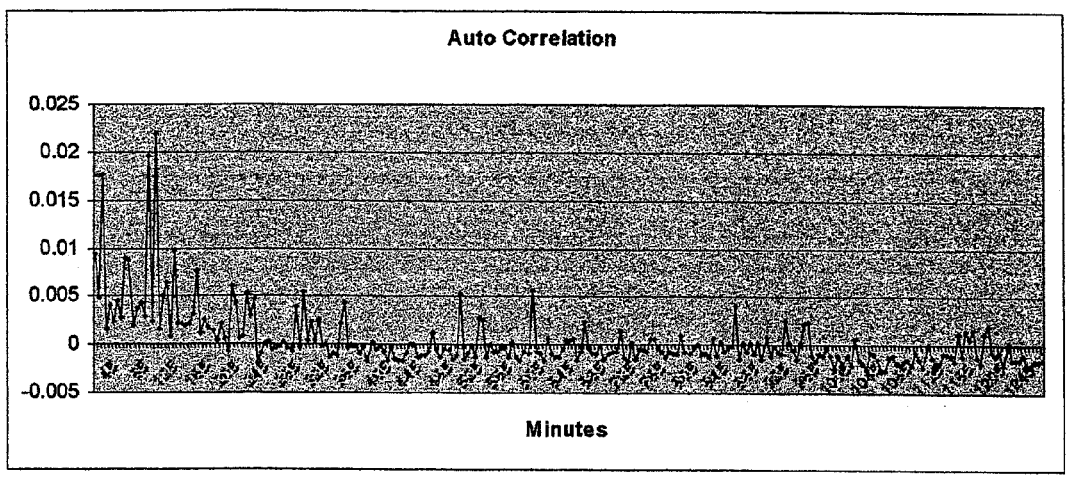
FIG. 3 illustrates the auto-correlation of the data sample shown in FIG. 2.

FIG. 2 illustrates a histogram of a sample data stream taken over a given period of time. In this example, the x-axis represents the download time and the y-axis illustrates the frequency or number of instances of the download time over the sample. As should be appreciated, the x-axis may represent other relevant values. FIG. 3 illustrates the auto-correlation of the data sample. For such network-based "total time" data, the inventors have recognized three important properties.

First, the marginal distributions are very heavy tailed, resulting in a large data to noise ratio. For example, the data has many spikes, often two orders of magnitude above the median. Second, the data appear to be uncorrelated. Expected daily variations are washed out in more complex "patterns." Finally, the "abnormalities" to be detected are mainly related to the increase or decrease of some kind of average (normal) time.

The findings influenced the system and method in at least two ways. First, the system and method can be simplified because the data appear to be uncorrelated and because the abnormalities relate to increases or decreases from a normal time. The data stream need not be treated as a stationary process. Changes in the data stream's dependency structure are immaterial. The system and method may monitor and detect unusual increases (or decreases) in the "location parameter" of the observed data.

Further, the heavy tailed marginals are indicative of variations or randomness in the measured download times. The randomness may be regarded as noise that alters the "true" time required for download.

Figure 4:
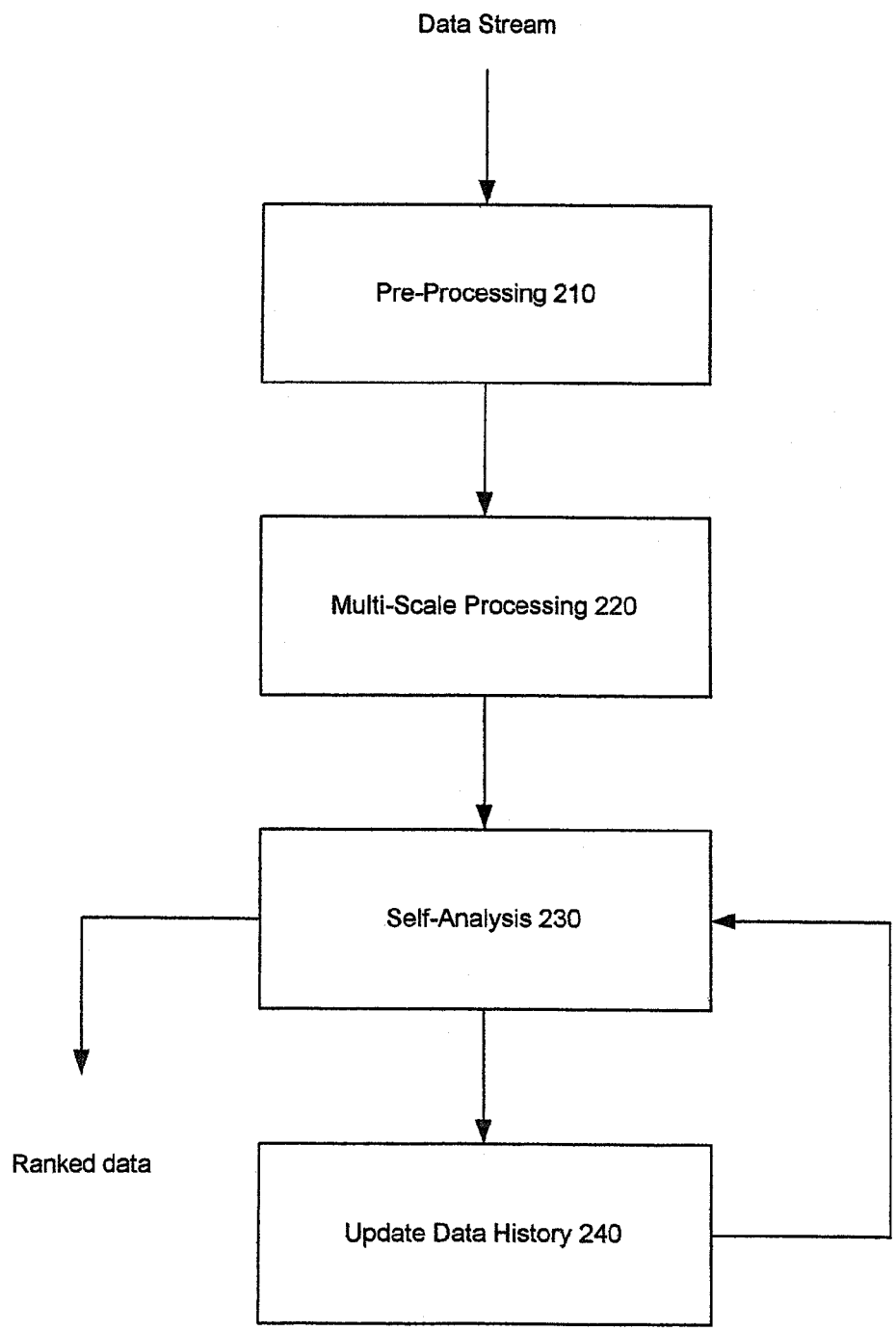
FIG. 4 illustrates an exemplary method for performing the analysis of a data stream in accordance with the present invention.

FIG. 4 illustrates an overview of the steps for processing a data stream according to an exemplary embodiment of the present invention. As shown at step 210 in FIG. 4, the method may begin with pre-processing of the input data stream. While some pre-processing of data is usually desirable, pre-processing may take several forms. Pre-processing may generally be performed to prepare the input data for multi-scale processing as indicated at step 220.

As illustrated by examples below, multi-scale processing 220 involves processing the input data stream in accordance with several different scales. The scales may vary in number and type, as discussed below. Following multi-scale processing 220, the processed data is subject to self-analysis at step at 230. Self-analysis 230 generally involves comparing more recent data in the data stream to previous data to determine a ranking. As shown in FIG. 4, one possible output of self-analysis is a historical ranking data. As discussed more fully below, ranking data may be generated for each of the scales in the multi-scale analysis. At step 240, the recent data may be incorporated into the data history. The data history may then be supplied back for use in self-analysis 230 of later items in the data stream. Thus, the processing of the present invention can provide real-time analysis of a data stream.

Figure 5:
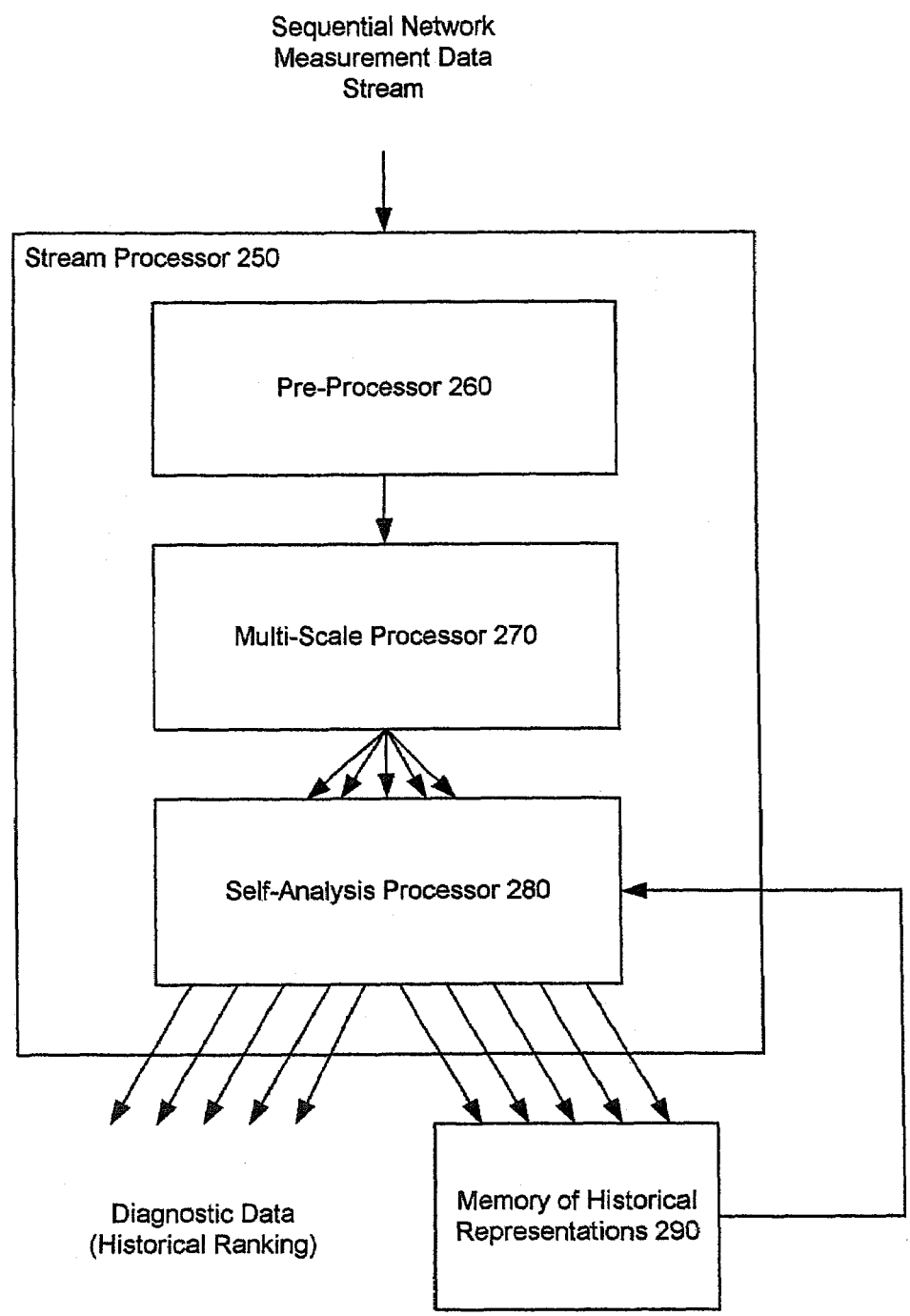
FIG. 5 illustrates an exemplary system for performing the method of FIG. 4.

FIG. 5 illustrates an exemplary system for performing the method according to FIG. 4. As shown in FIG. 5, a stream processor 250 includes a preprocessor 260, a multi-scale processor 270, and a self-analysis processor 280. The pre-processor 260 may receive and process the incoming data stream. The processed data is provided to a multi-scale processor 270. A self-analysis processor receives the output of the multi-scale processor 270 and also receives historical representations of historical data of the data stream from a memory 290, that stores the historical representations. Using the historical representations and the output of the multi-scale processor 270, the self-analysis processor 280 generates, for example, ranking data that ranks the incoming data stream relative to the history of data from the data stream. The self-analysis processor 280 also updates the historical representations based on the newly received data from the data stream and stores the updated historical representations in the memory 290.

The system of FIG. 5 may be implemented, for example, using multiple software modules run on one or more computers or other general-purpose processors. For example, the modules may be run on a single computer or processor, or may be distributed among plural computers or processors. Alternatively, individual application-specific processors and memory modules may be used to implement the system.

Figure 6:
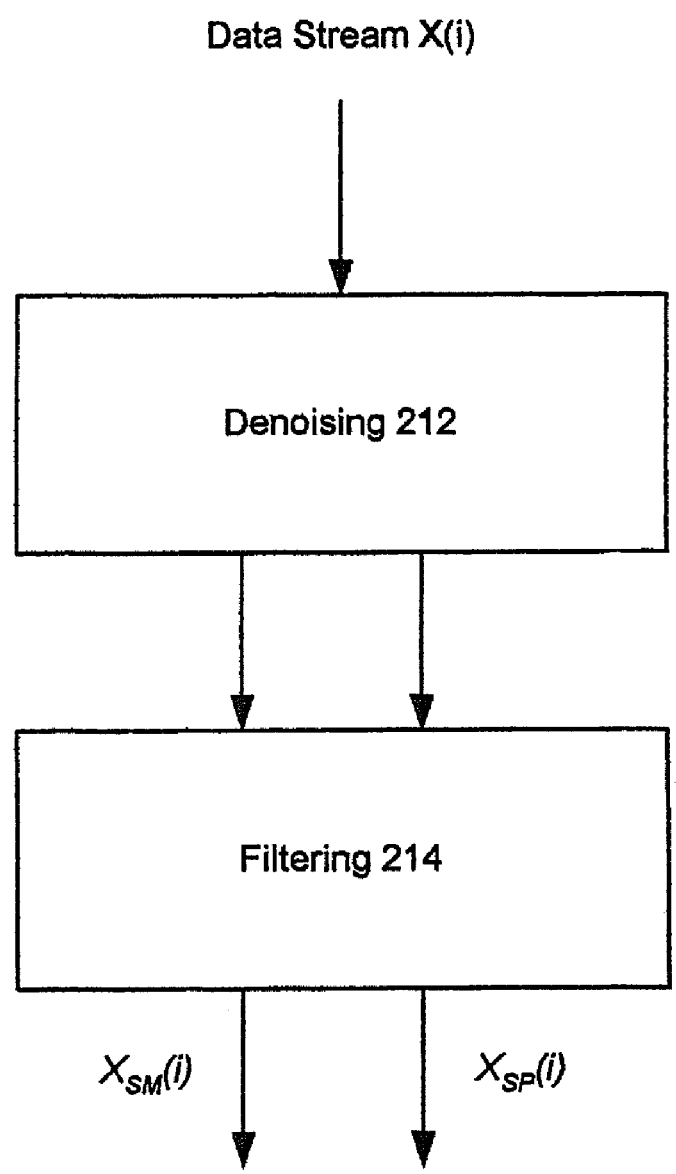
FIG. 6 illustrates an exemplary embodiment of the server complex.

FIG. 6 illustrates an exemplary method of pre-processing 210 according to the method of FIG. 4. The input data stream may be subject to a denoising operation at step 212. For example, this may involve splitting the input data stream into smooth and spiky parts. The data may then be filtered or transformed at step 214. The smooth and spiky parts can be generated according to the following relationships. Given the observed data X(i), its Median M is computed, and two data streams may be defined as follows:

Smooth stream as: $X_{Sm}(i) = \text{Min}(X(i), 3M)$,

Spiky stream as: $X_{Sp}(i) = \{\text{fourth root}\}$ $\sqrt{X(i)/2M} 1_{X(i)>2M}$.

The 3M and 2M values used to filter the streams in the above example were chosen empirically. Namely, anything that lasted three times longer than the median times was not included in the "smooth" stream and observations lasting twice as long as median were called spikes. Statistically, these two choices for cut-off points (3M and 2M) are acceptable for they typically involve only a small portion (5-10%) of the data. Of course, other cut-off values may be selected. The system and method is robust and has been successfully tested with different cut-off points.

The use of a root is a standard transform when dealing heavy-tailed random variables. The selection of the fourth root in the above example was empirical. Of course, other transforms or values may be used to achieve a similar result.

The filter produces data stream $X_{Sm}(i)$ by limiting the values of $X(i)$ to a maximum of 3M. That is, if the actual value $X(i)$ exceeds 3M, it is set to 3M. This in effect smoothes data stream $X(i)$. In producing the spiky data stream, the filter pushes spiky values toward "1" and non-spiky values toward "0". Of course, other "spiky" and "non-spiky" values may be used.

The filter may be embodied as a software-based filter or a hardware filter and may form part of pre-processor 260. It should be understood that other techniques and/or parameters may be used to generate or approximate the smooth and spiky streams. Moreover, while in the above example the filter is used to produce two data streams, it should be understood that the filter may be used to produce one or more data streams, for example smooth, intermediate, and spiky streams, with one or more attributes of the data enhanced and/or suppressed in the individual stream(s). Of course, the data stream does not need to be filtered and the succeeding processing steps may be performed without filtering.

Returning to the above example, the input data stream $X(i)$ in the illustrative example is separated into a smooth stream $\{X_{Sm}(i)\}$, and a spiky stream $\{X_{Sp}(i)\}$. As noted above, a categorical data stream, e.g., an error stream $X_{Er}(i)$ may be analyzed as will be discussed in more detail below. The errors of the errors data stream may be, for example, integer coded with $X_{Sm}(i)=0$, if there is no error. It should be appreciated that, if applied to a different type of data streams, this breakdown would not change the general nature of the processing method. For example, if the data do not have an error data stream and are not heavy tailed, the $\{X_{Er}(i)\}$ would always be 0 and $X_{Sp}(i)$ would most often be 0. The whole burden of detecting abnormalities would then naturally fall on $X_{Sm}(i)$.

Abnormalities can have at least two aspects: severity and longevity. Namely, some irregularities present themselves as an abrupt, unusually severe deviation from "normal" behavior. Other irregularities are manifested by an unusually prolonged moderate deviation from the "normal" behavior. Most of the abnormalities observed in the data sets are somewhere in between these two extrema.

Figure 7:
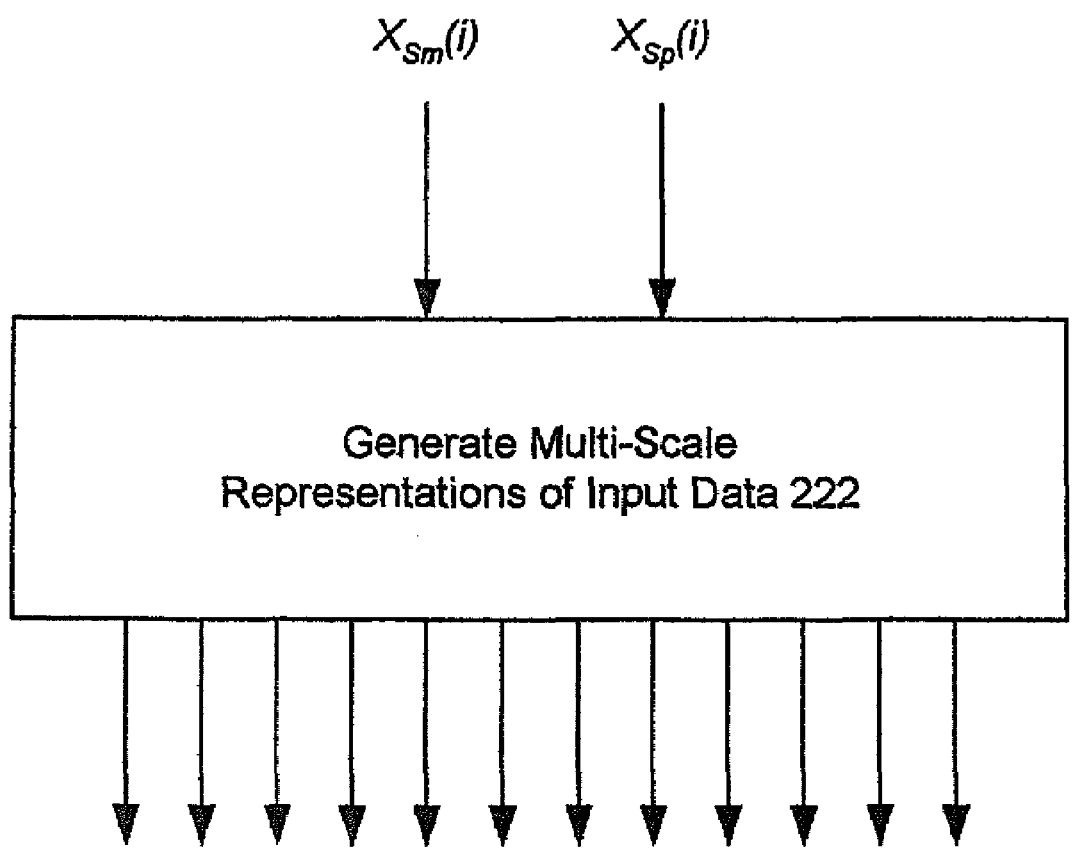
FIG. 7 illustrates an exemplary embodiment of smooth and spiky data streams broken down into multi-scale representations of the data.

In order to identify the abnormalities better, multi-scale processing of the input data is performed. According to one exemplary embodiment shown in the FIG. 7, the smooth and spiky data streams are broken down into multi-scale representations of the data, for example, using windows of various lengths, as indicated by step 222. If the input data results from measurements taken over time (e.g., measurements at fixed intervals or relatively-consistent intervals), the windows provide a time-dependent view of the data stream. An example of a set of multi-scale representations is provided below.

Given $k=1, \ldots, \text{nmax}_{Sm}$ window size $W_k=2^{k+1}+1$, set $$Sm(k) = \frac{1}{0.9W_k} \sum_{i=0.05W_k}^{0.95W_k} X_{Sm}[i]$$

Given $k=1, \ldots, \text{nmax}_{Sp}$ window size $W_k=2^{k-1}$ and $$Sp(k) = \frac{1}{W_k} \sum_{i=1}^{W_k} X_{Sp}(i)$$

In the above equations, $X[\ ]$ stands for order statistics. In order statistics, the data is ordered or sorted based on the actual values of $X_{Sm}$, rather than their sequence number i. Thus, in the above example, $Sm(k)$ considers only 90% of the values $X_{Sm}(i)$s, leaving out or truncating the smallest 5% and largest 5% of the values of $X_{Sm}(i)$s. This truncation of the values of $X_{Sm}(i)$s is not required, but reflects a conservative approach to detecting abnormalities. The window size $W_k$ corresponds to the last $2^{k+1}+1$ items of data received in the data stream.

It should be noted that, in the above example, the sizes of the windows are based on arbitrarily-selected exponential values, rather than natural time cycles (e.g., hours, days, weeks, months, etc.). If a natural cycle is assumed, then the processing can easily miss errors that do not follow the assumed time cycle. If a natural time cycle is known (or some other data dependence), then the windows can be tuned to that cycle. In general, however, at least some (if not all) arbitrary length windows are preferable because a natural time cycle may not exist (even if it is believed to exist) or may change over time. While exponentially-scaled windows are used as an example of windows of arbitrary length, other arbitrary-length windows may be used, such as polynomial-related window lengths among other known to those skilled in the art. Exponentially-scaled windows are convenient in that they provide a relatively good trade-off between resolution and range in analyzing the data stream. Of course, resolution may be increased by providing more windows. However, additional windows increase the memory and processing resources needed to implement the method. It should be appreciated that a designer implementing the present invention may select an appropriate trade-off between resolution and range in accordance with the needs of the selected application.

According to the above example, a larger number of smooth windows were provided since they are designed to capture more subtle, prolonged irregularities. These sizes are the result of extensive experimentation on real computer network data. However, the algorithm is robust and has been tested with different sizes (keeping the exponential character intact). Of course, as noted above, the number and/or length of windows may be set to other values depending on the needs and goals of the system.

As discussed above, Internet traffic (data transfer) is a poorly understood process. There is currently a consensus that the statistical nature of the data traces are fundamentally different from the classical settings (Poisson-type processes), but the true nature of these processes remains elusive. The literature is flooded with contradictory empirical and theoretical studies, further contributing to the confusion. The data represented in FIG. 2 has a very heavy tail that decays slower than $x^{-3}$. Therefore, the underlying probability distribution has infinite variance. Rather than imposing a classical model on the data, the system and method described herein uses an empirical approach. In other words, instead of assuming certain properties and distributions of the data, the present system and method uses previously collected real data as a model.

Figure 8:
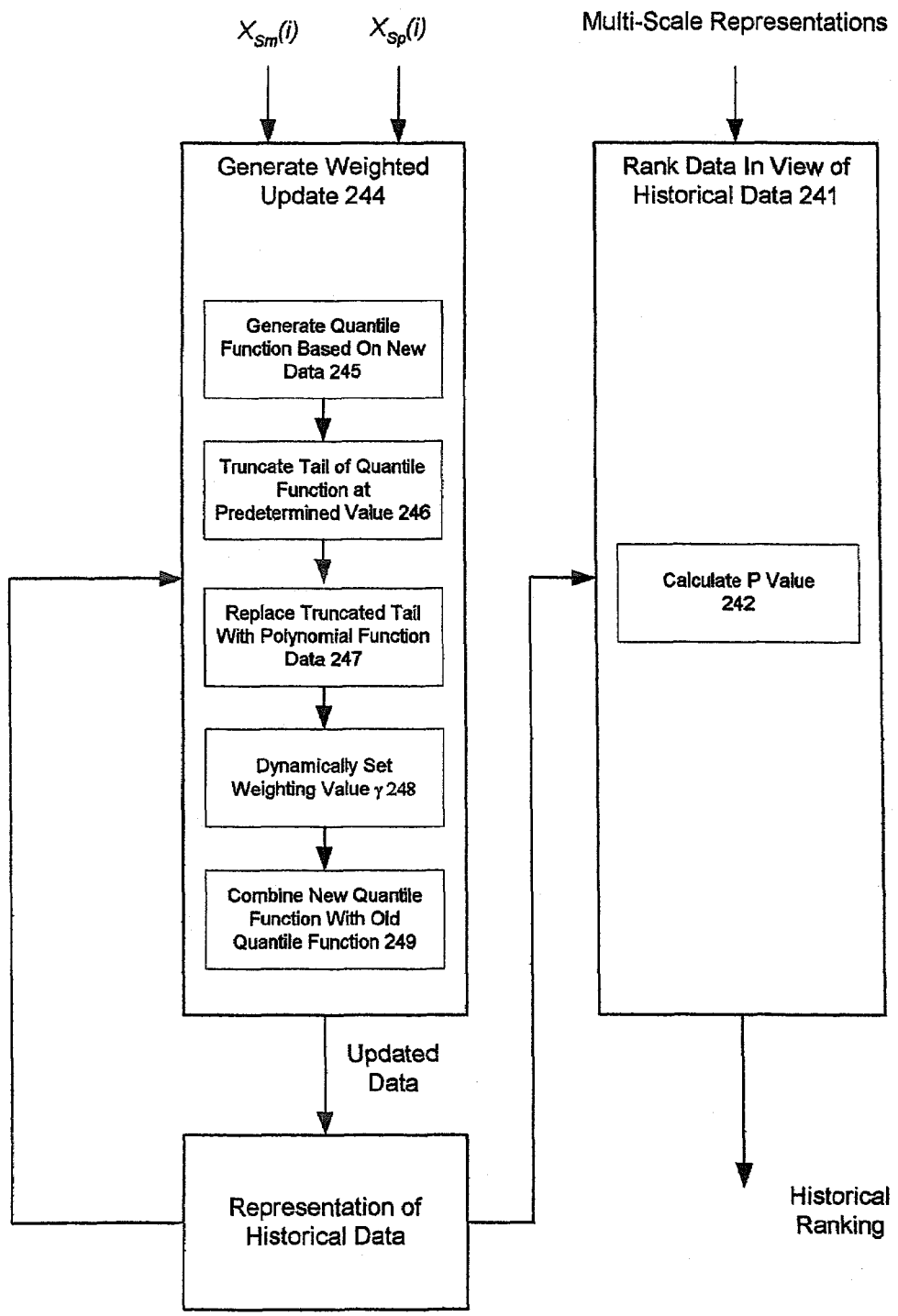
FIG. 8 illustrates additional details of the self-analysis step 230 of FIG. 4.

FIG. 8 provides additional details of the self-analysis step 230 of FIG. 4. In general, the self-analysis step 230 can provide at least two processes. First, the self-analysis step 230 can rank recent data in the data stream relative to previous data, as indicated at step 241. While further details are provided below, the ranking process 241 may be performed by comparing the multi-scale representations to historical representations of the historical data. One example of the ranking process 241 is the calculation of a P-value at step 242.

The self-analysis step 230 can additionally generate a weighted update of the historical data in view of the more recently received data, as indicated at step 244. For example, the historical data can be represented as quantile distribution functions of historical data. Each historical quantile distribution function can correspond to one of the multi-scale representations. As indicated at step 245 and described in more detail below, new quantile functions can be generated based on the new data from the data stream, where each quantile function corresponds to one of the historical representations. To prevent severely abnormal data from contaminating the historical representations, outliers in each new quantile function can be truncated at step 246 and the truncated data can be replaced by data from a predetermined function, as indicated at step 247.

As indicated at step 248, multiple dynamic weighting factors can be calculated, one for each of the new and old quantile functions. The new quantile functions may be combined with the historical quantile functions using the corresponding dynamic weighting factor, as indicated at step 249 and described in greater detail below. The dynamic weighting factors enable the historical quantile functions to adapt to new trends in the incoming data of the data stream.

A detailed description of the ranking step 241 and weighted update step 244 according to an exemplary embodiment will now be provided. Upon observing a new data point $\{X(i), Error(i)\}$ or set of points, the data streams $X_{Sm}(i)$, $X_{Sp}(i)$ may be constructed and all the appropriate windows $S_m(k)$, $S_p(k)$ and $E(k)$ can be calculated by going back in time. These new transformed data can then be ranked in comparison to prior instances of the data stream. For example, as noted above, the ranking may be generated by calculating a P-value that represents the portion of previously collected data smaller than a particular window. In other words, if for example Window 3 for the smooth data stream (i.e. Sm(3)) has P-value 0.995, this would mean that it is larger than 99.5% of all the cases previously observed and included in the stored data. Of course, other ranking schemes may be used to rank the current data to prior instances. For example, the P-value may represent the percentage of previously observed instances that are larger than a particular window. Alternatively, the ranking may provide a distance, percentage, or fraction from a median or average value. Further, percentages may be correlated to an alphanumeric or other categorical ranking scheme or the ranking may be provided in absolute terms.

According to the present example, the sequence $\{X_{Sm}(i), X_{Sp}(i)\}$ generates $nmax_{Sm}+nmax_{Sp}$ multi-scale representations. Assuming $nmax_{Sm}=7$ and $nmax_{Sp}=5$, then there would be 12 sequences Sm(k,i) and Sp(k,i) since there are 12 k's (7 k's for Sm and 5 k's for Sp). For convenience, the index i in Sm(k), Sp(k) has been dropped. The output may be, for example, the maximum of all the P-values for all windows. That is, the output may be the maximum P-value of the twelve P-values that correspond to the twelve sequences. Of course, this is merely an example and other outputs are possible. In other words, if any of the windows for any of the aspects (e.g., smooth, spiky and errors streams) is unusually high, the system would indicate it.

More particularly, given a transformed sequence, (say for Sm(3)), an estimate is made of the distribution function of historical data for this particular sequence (e.g., empirical quantile distribution for all previous Sm(3,i), i=1, ...). Use of the quantile distribution function saves memory since only a few hundred bins need to be recorded instead of tens of thousands of points. The quantile approach also enhances adaptability by allowing the historical data to be manipulated and smoothed out. As a new data point emerges (new Sm(3)) we can easily compute its P-value by:

$$Pval(x)=Q^{-1}(Sm(3))$$

where Q(t) is an empirical estimate of the quantile function for the particular window and particular sequence (e.g., spiky or smooth). Note, the quantile functions are stored in memory for each of the sequences—all windows and all the aspects (e.g., smooth and spiky streams).

As should be clear from the above description, the median is used to compute the data streams $X_{Sm}(i)$ and $X_{Sp}(i)$ and, thus, the windows. While the median may be estimated based on the current data, this median may be expected to change over time. Likewise, all the quantile functions that are based on sequences computed with respect to the "median at that instant of time" will change. Since the history will inevitably contain some true abnormalities, a technique for trimming outliers should be implemented. If not, some severe abnormal events will occur eventually and will otherwise be included in the data history. This in turn could mean that for a very long time any other irregularities (less severe than the mentioned bad event) would not be classified as unusual. In other words, the method would lose its sensitivity to moderately abnormal events. In addition, if the system starts to gradually deteriorate, by continuously adding new observations, the history would gradually change and any new data would not be classified as unusual.

According to one exemplary technique, a predetermined length of initial data (e.g., 1000 values) is used to compute the median, "smooth" and "spiky" sequences, $X_{Sm}(i)$, $X_{Sp}(i)$, i=1,1000 and then all the appropriate windows Sm(k,i), Sp(k,i). Next, for each of these sequences the appropriate quantile function can be computed. For example, the following resolution mapping may be used in generating the quantile function:

| | |
|---|---|
| For 1% → 97% | at 1% resolution |
| For 97% → 100% | at 0.033% resolution |
| For 0% → 1% | at 0.33% resolution |

Consequently, the complete history for each quantile function can be captured with only 200 numbers (i.e., 3 numbers for 0% to 1%, 97 numbers for 1% to 97%, and 100 numbers for 97% to 100%). The increased resolution of 0.033% is used because an important portion of the analysis and thresholding may be expected to relate to high P-values (0.99% and more). The increased resolution of 0.33% for small values may be used in applications of the invention where "too fast" errors are of interest. For example, when measuring network download times, unusually fast download times may be indicative of erroneous operation and therefore may be of interest. Of course, the above resolution map is merely exemplary and a different mapping function can be tailored to the particular needs of the analysis and/or system resources.

As noted above, outlier data can be trimmed so that the histogram is smooth. The histogram of collected data in FIG. 2 indicates a probability distribution with a well defined tail. This suggests that there is an underlying acceptable probability distribution that is corrupted with a long string of outliers stretching out several orders of magnitude. With this in mind, the quantile function may be cut at a certain level (for example at 98%) and then extended from that cut off point with a probability density $$p(t) = \frac{c}{t^q}$$

where q depends on window size.

For example, starting with the 98$^{th}$ percentile (in this example Q(133), where Q is the quantile function), the histogram is smoothly extended with formula For i=1, ..., 67, we let $$Q(133+i) = \frac{Q(133)}{(1-i/68)^{1/(1+k)}},$$

where k stands for the windows order (i.e. first, second, ...).

With this modification the quantile functions may be extended in a smooth and conservative fashion. For example, the smallest window size (i.e. k=1) yields an extension that does not have a variance. In other words, from 98% (M98) onwards, a heavy tailed distribution (no variance) is applied. If data supports tails heavier than $x^{-3}$, such data will be treated as outlier data and discarded in this example. If the real data is not heavily tailed, the described approach will shield against detection of false positives, as it will be harder to declare an observation unusual.

For a more conservative approach, larger windows may be modified by taking roots of higher order, i.e. k+1's roots. Namely, these windows may be taken after averaging a considerable number of already trimmed data. The Central Limit Theorem implies that such windows will behave in a "Gaussian like" manner and should exhibit "exponential tails", thus implying logarithmic transformation in the foregoing equation. However, to be more conservative (shielding again from false positives), polynomial tails (k+1's roots) may be adopted instead.

According to one preferred embodiment of the present invention, outliers are trimmed periodically from the quantile functions. Trimming prevents the predetermined cut-off point from being unstable over time. For example, as more and more data is added, the point M98 can converge to zero, for it would effectively become 98% of 98% of 98%, etc. The collected data may be split into blocks (e.g., of length 1000) and trimming can be performed on these blocks. In other words, after a fixed period of time (e.g., 1000 observations), the quantile functions for these new 1000 data points will be computed and then polynomially extended at the predetermined (e.g., 98%) level using the above formula. Only then will the new data be added to the historical quantile functions. Again, this may be performed for all windows sizes and for all breakdowns (e.g., both smooth and spiky). Two quantile functions may be added by combining two sets of data (each produced by the one of the quantile functions), and then recomputing the quantile function.

In addition to trimming outliers, the method should be capable of learning in certain applications. For example, in network performance measurement applications, it is expected and has been observed on several occasions that the data stream tends to change properties over time. Different web-page layouts, the addition of new customers, hardware/software updates, etc. all inevitably cause statistically significant changes in the time sequences. It would be desirable for the method in such applications to adapt automatically to these acceptable changes.

However, learning is slow if the process is too conservatively weighted. For example, if a historical quantile function is based on 100,000 data points, and if for some reason a web-page takes 10% longer to download (for example, due to a new feature added to the page), the process would be extremely slow to adapt. Even after months of continuously adding new data to the history, the method would still detect very "unusual" behavior. For these reasons, periodic updates may be performed with exponential weighting.

Namely, given a weighting factor γ and "New quantile functions" based on last predetermined number of data points (and after trimming), let:

Old quantile function=(1−γ)Old quantile function+γNew quantile function

With γ=0.05, the process will keep fewer points (e.g., roughly only the last 10-20 thousand) and more heavily weight recent data, thus speeding up adaptations.

The above technique speeds up the adaptation substantially, but it is static. It does not take into account how much different the new quantile functions are from the old. According to a further embodiment, the above-technique can be enhanced by implementing a dynamic update of the quantile function. Given OldMedian and NewMedian (the later based, for example, on the last 1000 points), compute:

δ=Min [0.2,|OldMedian−NewMedian|/OldMedian]

$\gamma = \delta C_1 + C_2$ where $C_1 = 4.5$ and $C_2 = 0.05$

Finally:

Old quantile function=γNew quantile function+(1−γ) Old quantile function

OldMedian=γNewMedian+(1−γ)OldMedian

The constant values 0.2, 0.45, and 0.05 are motivated by the Central Limit Theorem for medians, and empirical evidence. Of course, other values may be chosen depending on the application.

Thus, according to the example, if the median of the last 1000 data points is not significantly different from the current median, γ≈0.05 and the process resembles the static case. On the other hand if the new median is significantly different from the old median, a strong case exists for speeding up the adaptation. The median is a very robust location estimator and the fact that it has been computed for a significant number of points (e.g., 1000 in the present example) strongly suggests that this "unusual" behavior is acceptable now and should be learned very quickly. More generally, the median for a statistically significant sample of the most recently collected data is calculated and compared to the median for the previous quantile function. If the new median differs strongly from the old median, the recent sample is heavily weighted when combined with the old quantile. This in effect achieves rapid learning of the new environment that produced the recent data. On the contrary, if the new median approximates the old median, the newly collected data is lightly weighted when added to the old quantile. Of course, while the details of combining the data may differ, it should be appreciated that the same or similar technique may be used to dynamically update any representation of the previously collected data stream points.

In the extreme case, when the median of the last 1000 data points is significantly different from the current median, γ=0.95 which essentially implies an almost instant learning.

The advantage of this methodology is that it can run completely in automatic mode with the guarantee that it will always adapt to any changes rapidly. In the network environment, the parameters may be set so that the method learns new behavior in a day or two. Of course, the speed of learning can be calibrated depending on the application to which the method is applied.

Finally, the method may be immunized to gradual deterioration of data. The periodic-dynamic update takes care of all the cases seen in real data. To be conservative, a buffer of predetermined length (e.g., 1000 data points) may be kept between the history and the last update. The buffer may be part, for example, of memory 290. For example, an initial period of 1000 points may be used to build the history and the next 1000 data points are kept unchecked in a buffer. The analysis then starts at the 2001st point. Once the 3001st point is reached, points 1001-2000 are used to construct and trim the quantile function (e.g., smoothly on the 98% level) and added dynamically to the "Old" quantile function. The buffer's 1000 points is then replaced with observations 2001-3000. Only then is the 3001st point compared with the Old histogram. Thus, in this example, there is always at least a 1000-point gap between the observed point and the history it is being compared with. Of course the buffer size used may be varied and, if desired, tailored to the application. In most applications, it is desirable that the buffer is large enough to hold a statistically significant sample of the collected data.

Categorical data can differ from ordinal data in several respects. For example, two ordinal values may be inherently related in that one can be larger (smaller), faster (slower), etc. than the other. In contrast, data of one category can have no relation to that of another category. For example, an instance of error type 4 may be completely unrelated to an instance of error type 5. Nonetheless, in general, the processing and detection of categorical data streams may be similar to that of the ordinal data streams described above. In general, the method and system illustrated in FIGS. 4 and 5 may be used to analyze categorical data.

Figure 9:
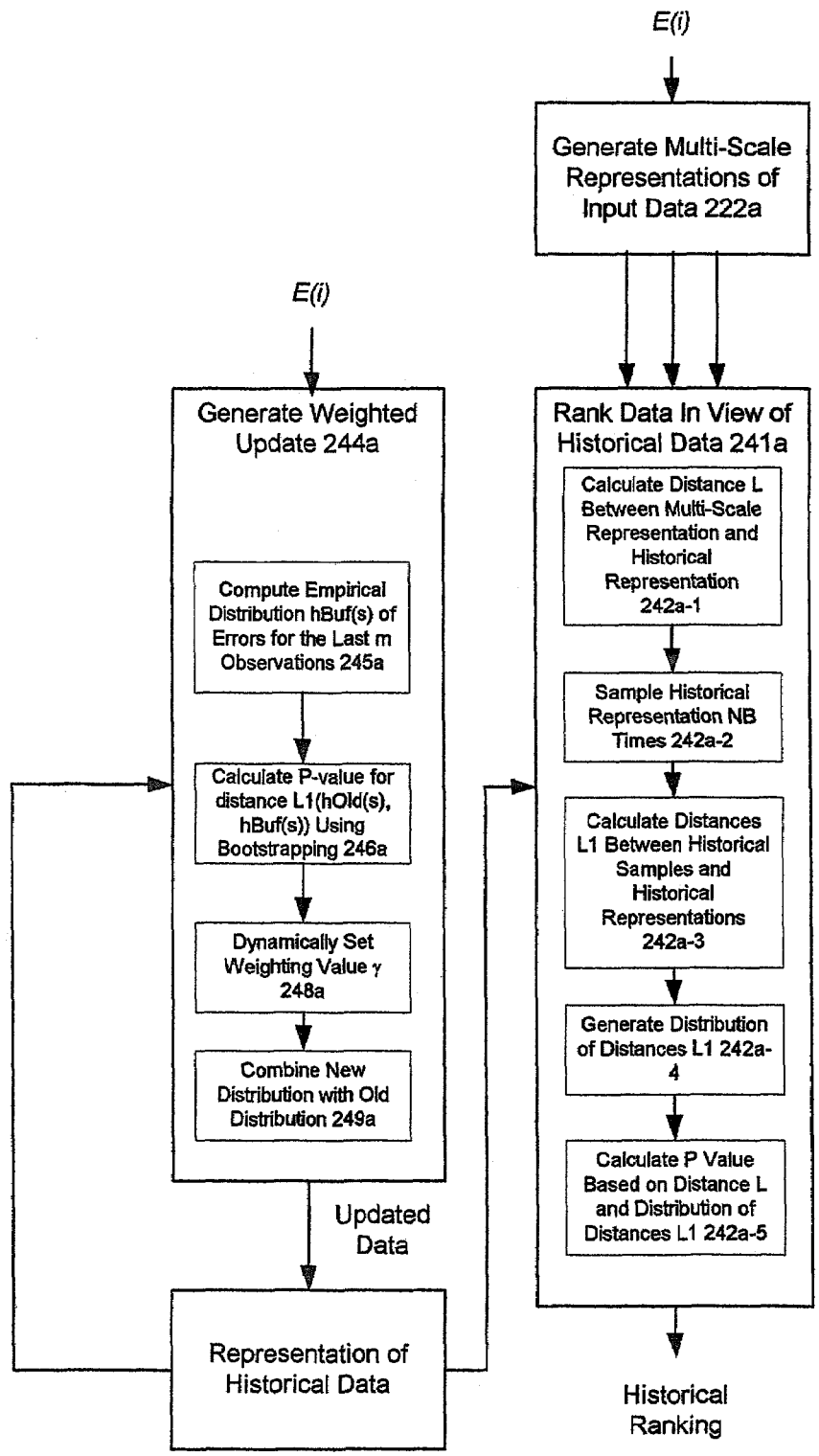
FIG. 9 illustrates an exemplary embodiment of the processing of a stream of categorical data using error data.

The processing of a stream of categorical data will now be described in detail in connection with FIG. 9, using error data as an example. Analysis of an error stream might sound unusual, for having observed an error, one would expect (by default) that this must be an unusual observation. However, actual errors experienced may be far from exact, often representing human interpretation. Moreover, errors may occur on a fairly regular basis not strongly related to the health of a complex system. In practice, some data files may be full of errors. Some errors may not be really significant and, in such instances, the method could learn to ignore them. On the other hand, some errors (or in some cases a combination of errors) seem to happen quite abruptly and are correlated with a true problem affecting system health.

As mentioned above, the errors may be coded with integers {0, 1, 2, 3, . . . } in the present example, with 0 meaning "No Error". Thus, an error E(2) is indicative of an error of type 2. The error stream may be subject to pre-processing, such as coding, grouping by functionality or other criteria, and/or prioritization, for example. At step 232a, multi-scale representations of the input data are generated. For example, a predetermined number of window sizes may be used and the frequencies of all errors for a particular window of data can be computed. For example, three window sizes 1, 10 and 100 may be represented as: $W_k=10^{k-1}$, where k=1, 2, 3., and E(k) is the empirical distribution based on last the $W_k$ data points. In accordance with a preferred embodiment, the method does not simply count the number of errors per window. It should be appreciated that the distribution of observed errors is important. For example, certain errors are more frequent and it should not be alarming to see 3-4 of them per window of 100 data points. On the other hand, some infrequent errors that appear 3-4 times for the same window should be a cause for alarm. Similar reasoning is in order for a certain combination of errors, since some combinations may seem to appear more or less on a regular basis, while some are strongly related to a problem.

As noted above, an error data stream may be processed and analyzed in a similar way to the time data stream described previously. Starting with an initial period, a buffer is kept of current data and the error data history is updated periodically. While some features are easier for error data (e.g., quantile, medians and timing can be avoided), computing a P-value is more complicated. For example, suppose in a window of 100 most recent observations, h(0)=0.95, h(3)=0.2 and h(7)=0.3. In other words, 95 "No Errors", 2 Errors of the "type 3", and 3 errors of the "type 7" were observed. The method then determines how unusual this error distribution (histogram) is compared with historical data. This may be done by ranking, as indicated at step 241a.

More particularly, given a distribution (i.e. density function) for a fixed new window $h_1(s)$, and given a historical distribution based on thousands of previously recorded data points $h_0(s)$, a distance $L_1$ between these two distributions (histograms) can be computed as:

$$L_1(h_1, h_0) = \int |h_1(s) - h_0(s)| ds$$

This is represented at step 242a-1. Suppose now that $L_1(h_1, h_0)=0.076$. The system may then determine whether this computed distance is small or large. To do this, a Boostrap procedure may be implemented. In order to judge how unusual the $L_1=0.076$ is, some understanding of how $L_1$ usually behaves is necessary. In other words, how much does a typical histogram based on a sample of 100 deviate from the original distribution.

Let $X_i$, i=1, . . . , 100, be an independent identical distribution (i.i.d.) sample from some distribution P, and let $h_{1,100}$ be empirical histogram based on these 100 points. The following process does not depend on sample size 100, so we will replace it with dummy variable m. A random variable may be defined as:

$$D(m) = L_1(h_{1,m}, h_P) = \int |h_{1,m}(s) - h_P(s)| ds$$

where, $h_p(s)$ is a density for the probability distribution P.

While $h_p(s)$ is not known, it can be estimated by $h_N(s)$, which is an empirical estimator based on all the historical data $X_i$, i=1, . . . , N. This is acceptable since:

$$L_1(h_{1,m}, h_N) = \int |h_{1,m}(s) - h_P(s) + h_P(s) - h_N(s)| ds = L_1(h_{1,m}, h_P) + O_P(N^{-1/2})$$

and N>>m. Next, a Bootstrap sample may be defined for fixed i<NB as $$X^*_{i,j}, j=1, \ldots, m \text{ is an i.i.d. sample from } h_N(s)$$

In other words, given the historical distribution $h_N(s)$, m points are independently sampled from the distribution. The m points represent the i'th Bootstrap sample. This is repeated NB times (the Bootstrapping sample size), as indicated at step 242a-2. Each i corresponds to a sample of size m, for which a Bootstrap histogram $h^*_{m,N}(s)$ is computed. The index N is retained as the Bootstrap sample indirectly depends on it, through $h_N(s)$).

At step 242a-3, the Bootstrapped $L_1$ distance is calculated between each of the samples and the historical distribution. The distances $L_1$ can used to form a probability distribution of distances $L_1$, as indicated at step 242a-4. For example, the Bootstrapped $L_1$ distance can be computed as:

$$D^*_i(m,N)L_1(h^*_{m,N},h_N)=\int |h_{m,N}(s)-h_n(s)|ds$$

Empirical Processes Theory (e.g., Dudley, R. Uniform Central Limit Theorems (1999) Cambridge) as well as its Bootstrapped counterpart (e.g., Gine, E. and Zinn, J. Bootstrapping general empirical measures. Ann. Probab. 1990) guarantees that the above sequence of random variables $$(D^*_1(m,N))_{N=1}^{\infty}$$

converges in distribution to D(m). Therefore, (provided that N>>m) in order to compute the distribution of D(m) it is sufficient to consider the empirical distribution based on the Bootstrap sample $$D^*_1(m,N)_{i=1}^{NB}.$$

Finally, the distance L between the multi-scale representation and the historical representation is calculated against the Bootstrapped distribution of $L_1$, as indicated at step 242a-5. For example, the P-value for $L_1(h_1,h_0)=0.076$ is generated by computing the proportion of the sample $$D^*_i(m,N)_{i=1}^{NB},$$

that is smaller than 0.076.

It is conceivable (and it has been observed on real data) that the system occasionally will be flooded with errors for a prolonged period of time, for example due to updates. This would result in a history with considerable percentage of errors (say 15%). If the next window of 100 has all 100 zeros, the process would declare an errorless sample "very unusual," for it is statistically almost impossible to produce 100 zeros if the probability of 0 is 0.85. In this case, the method is formally correct since, with respect to observed history, the 100 zeros vector is unusual. However, it may not be desirable for the system to alarm unusually good periods.

One way to avoid this situation is to enhance the P-value computation. Namely, given a P-value from the above algorithm, the following may be used:

Let Po be probability of "No Errors" for the particular window.

If (Po>0.9) then P-value=P-value $(1-3000(Po-0.9)^4)$.

The above formula forces the P-value towards 0 in the case when probability of "No errors" is higher than 0.9. The particular form of the formula adjusts the P-value in a smooth and concave way.

As indicated at step 244a, the new categorical data may be added to the historical data to update the historical data. If there is no median to serve as a guide, it may not be clear what measure to use in order to dynamically update the history. Before updating, the whole "new data" buffer may be treated as a vector. The histograms of errors for this vector and its $L_1$ distance from the "old" distribution may be computed. Bootstrapping may then be performed for this size (e.g., 1000 points). In this way, the above buffer P-value can be used to calibrate how "unusual" the buffer is.

The following procedure gives an example of a precise way for performing the dynamic updating for categorical data streams. Starting with a historical "old" distribution of errors $h_{Old}(s)$, and given a buffer of a predetermined size (e.g., 1000 data points), $h_{Buf}(s)$ (i.e., the empirical distribution of errors for the last predetermined number of observations, for example, 1000) is computed at step 245a. The P-value for $L_1(h_{Old}(s), h_{Buf}(s))$ is determined by performing the above Bootstrapping procedure with m=1000, at step 246a. Then, the dynamic weighting factor γ is computed at step 248a and the distributions $h_{Old}$ and $h_{Buf}$ are combined at step 249a. For example:

$$\gamma = 0.95_{Pval>0.95}^{\frac{0.05}{1-Pval}} + 0.95_{Pval\le 0.95} \text{ and}$$

$$h_{Old} = \gamma h_{Old} + (1-\gamma)h_{Buf}$$

For small P-values (<0.95), updates may use a fixed γ=0.95, thus in the above example keeping roughly 10-20 thousands points in history. On the other hand, for the unusually high P-value>0.95, updates using much smaller γ may be used to promote faster learning.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

The invention claimed is:

1. A method of identifying unusual behavior in a data stream of data relating to electronic data processing performance, comprising:
   receiving the data in the data stream,
   processing the received data;
   generating a plurality of representations of the processed data, wherein the representations are generated from different lengths of the processed data, at least one length being arbitrarily selected; and
   comparing the representations to historical data to identify unusual behavior.

2. The method of claim 1, wherein the different lengths of the processed data are exponentially related.

3. The method of claim 1, wherein the different lengths $W_k$ of the processed data are related according to $W_k=2^{k+1}+1$, where k ranges through the whole numbers between 1 and N, and N is the number of representations of the processed data generated.

4. The method of claim 1, wherein the different lengths of the processed data are related by a polynomial function.

5. The method of claim 1, wherein the step of comparing comprises generating a ranking value.

6. The method of claim 5, wherein the ranking comprises a P-value.

7. The method of claim 1, wherein the historical data comprises a plurality of historical data representations based at least in part on previously received data in the data stream.

8. The method of claim 7, wherein the historical data representations comprise quantile functions based at least in part on the previously received data in the data stream.

9. The method of claim 8, wherein resolution of the quantile functions varies through the domain.

10. The method of claim 1, wherein the step of processing the received data comprises filtering the received data to produce at least two sub-streams, and wherein the step of generating the plurality of representations of the processed data further comprises generating the plurality of representations of the processed data for one of the sub-streams.

11. The method of claim 10, wherein the filtering further comprises generating a first sub-stream in which spikes in the received data are suppressed and generating a second sub-stream in which spikes in the received data are enhanced.

12. The method of claim 1, wherein the step of processing the received data further comprises filtering the received data to produce at least two sub-streams comprising at least a first sub-stream and wherein the step of generating the plurality of representations of the processed data further comprises generating the plurality of representations for the sub-streams, wherein the representations for the first sub-stream are generated from different lengths of the processed data.

13. The method of claim 1, wherein the length of the processed data is based on an interval of time.

14. The method of claim 1, wherein the length of the processed data is based on a count of items of data.

15. The method of claim 1, wherein the historical data comprises a plurality of historical data representations based at least in part on a subset of the received data, the subset having items of data with positions in the data stream that are greater than a selected distance in the data stream from a most recently received item of data in the data stream.

16. A method of identifying unusual behavior in a data stream of categorical data, comprising:
    receiving data in the data stream, the data relating to multiple different categories;
    generating a plurality of representations of the data, the representations generated from different lengths of the data from the data stream, at least one length being arbitrarily selected;
    calculating a plurality of comparison values by comparing the representations to historical data of the data stream;
    generating multiple distributions of the calculated comparison values using the historical data; and
    ranking the calculated comparison values based on the multiple distributions of the calculated comparison values.

17. The method of claim 16, wherein the step of calculating a plurality of comparison values comprises calculating a distance between a first representation and a corresponding historical representation based on data previously received from the data stream.

18. The method of claim 16, wherein the step of generating multiple distributions of the calculated comparison values comprises the steps of:
    generating random samples of a set of historical data of predetermined size;
    calculating distances by comparing the random samples to the historical data; and
    storing the calculated distances as a histogram.

19. The method of claim 16, wherein:
    the calculated comparison values comprise a first calculated comparison value having a first representation associated therewith; and
    the ranking further comprises ranking the first calculated comparison value based on a distribution associated with the first representation.

20. In a method of identifying unusual behavior in a data stream of data relating to electronic data processing performance using a representation of historical data of the data stream, a method of updating the representation of historical data of the data stream comprising:
    generating a dynamic weighting factor based on a relative difference between a set of data to be added to the representation of historical data and the representation of historical data; and
    combining the data to be added with the representation of historical data using the dynamic weighting factor to generate an updated representation of historical data.

21. The method of updating of claim 20, further comprising the step of processing the data to be added to the representation of historical data.

22. The method of updating of claim 21, wherein the step of processing comprises:
    generating an update representation of the data to be added to the representation of historical data;
    truncating data from the update representation relative to a threshold point; and
    replacing the truncated data with data generated from a predetermined mathematical function.

23. The method of updating of claim 22, wherein the step of combining the data to be added with the representation of historical data using the dynamic weighting factor comprises adding the product of the update representation and the weighting factor with the product of the representation of historical data and the result of one minus the weighting factor.

24. The method of updating of claim 20, wherein the step of generating a dynamic weighting factor comprises the step of using a median of the set of data and a median of the representation of historical data.

25. The method of updating of claim 24, wherein the step of using the median of the set of data and the median of the representation of historical data comprises determining a relative difference between the median of the set of data and the median of the representation of historical data.

26. The method of updating of claim 25, wherein the relative difference includes the absolute value of the difference between the median of the set of data and the median of the representation of historical data.

27. In a method of identifying unusual behavior in a data stream of data relating to electronic data processing performance, a method of ranking received data against historical data of the data stream comprising: generating a representation of the data to be ranked by generating a window value based on a predetermined number of data elements; and comparing the representation of data to be ranked against a representation of historical data to generate a ranking of the data to be ranked.

28. The method of ranking of claim 27, wherein the step of comparing comprises generating a P-value.

29. The method of ranking of claim 27, wherein the representation of historical data comprises a distribution of historical data for a window of the predetermined number of data elements.

30. The method of ranking of claim 27, wherein the representation of historical data comprises a distribution of historical data.

31. In a method for analyzing data in a data stream using historical representations of data previously received in the data stream, a method for trimming data from inclusion in the historical representations, comprising:
    identifying a subset of the received data that has items of data with positions in the data stream that are greater than a selected distance in the data stream from a most recently received item of data in the data stream, and
    basing the historical data representations at least in part on the subset.

* * * * *